March 11, 1958     J. R. NEW     2,826,113
PROJECTING APPARATUS
Filed Nov. 1, 1954     2 Sheets-Sheet 1
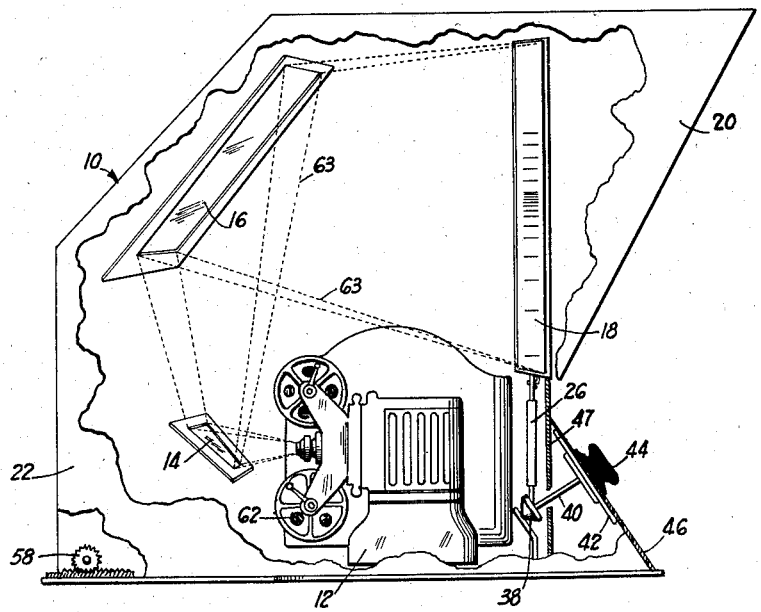
INVENTOR.
James R. New
BY
ATTORNEY

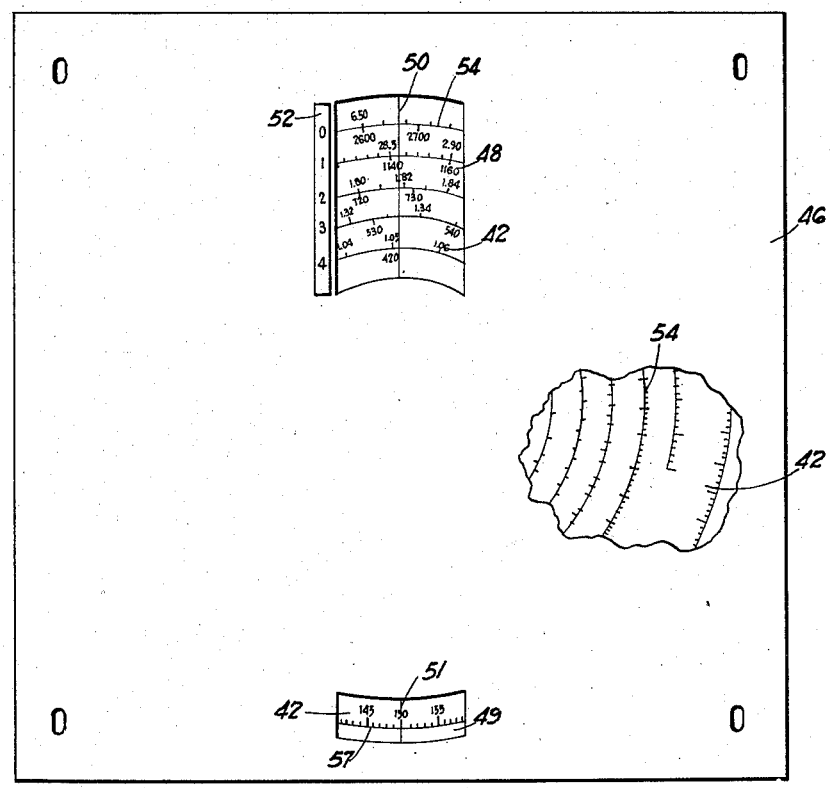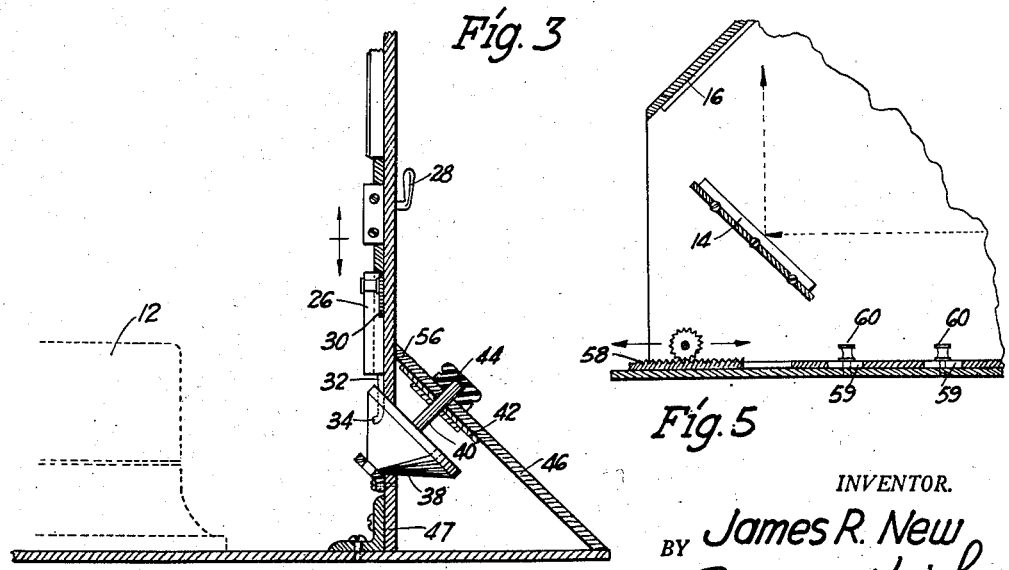

United States Patent Office 2,826,113
Patented Mar. 11, 1958

2,826,113

PROJECTING APPARATUS

James R. New, Tulsa, Okla.

Application November 1, 1954, Serial No. 465,819

5 Claims. (Cl. 88—24)

This invention relates to film projecting devices or instruments and more particularly, but not by way of limitation, to a projector adapted to measure images on film by correlating data on the film with data on the projection screen.

There are many devices on the market today for the purpose of determining elevations of terrain. Among these is a topographic camera disclosed in W. O. Bazhaw's Patent No. 2,616,177, dated November 4, 1952. Although this camera has been used very successfully, it has been found, as a practical matter, that a great quantity of tedious, time consuming calculations and computations must be made in order to arrive at desired elevational and bearing figures. This is a costly operation in that many trained workers must be maintained to obtain the desired results from the data recorded on the film.

The present invention contemplates a projector adapted to cast film images onto a screen having certain data inscribed thereon. The film image may be adjusted to coincide with the inscribed data on the screen so that readings may be taken directly from a calibrated dial utilized in conjunction with the projector. The direct readings substantially eliminate the laborious calculations and computations now necessary to determine the desired elevational and bearing information. The novel instrument not only reduces the time and cost of obtaining desired results, but also substantially eliminates the possibility of human error in the computations required in establishing terrestrial elevations, bearings and the like.

It is, therefore, an important object of this invention to provide a projection apparatus adapted to coordinate elevational and bearing data recorded on film with data inscribed on a screen in order to permit direct readings from the screen and a dial cooperating therewith which substantially reduces the mathematical calculations required in determining terrestrial elevations and bearings, thereby reducing the time involved and increasing the accuracy of the results.

It is another object of this invention to provide a projection apparatus adapted to coordinate filmed elevational and bearing data with data inscribed on the projection screen to facilitate computation thereof, and which is simple in operation and economical in construction.

Other objects and advantages of the invention will be evident from the following detailed description, read in conjunction with the accompanying drawings, which illustrate my invention.

In the drawings:

Figure 1 is a side elevational view of the novel projection instrument with a portion of the housing cut away to more clearly show the fundamental elements of the apparatus.

Figure 2 is a front elevational view of the novel instrument apparatus depicting a film image cast upon the projector screen.

Figure 3 is an enlarged view of the dial panel of the invention with a portion of the panel cut away for clarity.

Figure 4 is a side elevational view of a portion of the instrument depicting the mechanism for raising and lowering the screen.

Figure 5 is a perspective view showing a detail of the cone member for the vertical adjustment of the screen with portions shown in dotted lines for clarity.

Figure 6 is a side sectional view of the reflecting mechanism of the invention.

Figure 7 is an enlarged detail showing the data inscribed on the projector screen.

Referring to the drawings in detail, reference character 10 refers in general to a converter projection apparatus which comprises a projector 12, a pair of reflection surfaces, or mirrors 14 and 16 and a screen 18 encased within a housing 20. The projector 12 is disposed between the screen 18 and the mirrors 14 and 16 in such a manner that the screen 18 may be easily viewed from the front of the apparatus as clearly shown in Figs. 1 and 2. The projector 12 may be any suitable type mechanism and the mirrors 14 and 16 are disposed at appropriate angles to each other for reflecting film images onto the screen 18, and are secured to the side walls 22 of the housing 20 in any suitable manner (not shown).

The screen 18 is preferably made of frosted glass or the like and is inscribed with a plurality of horizontal lines 24 and 25 (Fig. 7) vertically spaced to correspond with calculated data as will be hereinafter set forth. The screen 18 is secured in any suitable manner (not shown) to a suitable linkage system 26 and may be moved vertically by a lever 28 (Figs. 2 and 4) which operates a rack and pinion unit 30 (Fig. 4) cooperating with a shaft 32 having an angled lower end 34 which rides in a spiral groove 36 (Fig. 6) provided in a cone 38 which is secured to and rotated by a central shaft 40. A dial 42 and a knob 44 are rigidly secured to the shaft 40 in any suitable manner (not shown). The rotation of the cone will raise or lower the shaft 32 riding in the spiral groove 36 thereby causing a simultaneous raising or lowering of the screen 18. It will be apparent that manual adjustment of the screen 18 by lever 28 will rotate the knob 44 and also rotation of the knob 44 will vertically adjust the screen for a purpose as will hereinafter be set forth.

A panel 46 extends outwardly at an angle from a front baffle 47 of the housing 20 and is secured thereto in any suitable manner (not shown). The panel 46 is disposed between the knob 44 and dial 42, and is secured to the baffle 47 in any suitable manner (not shown). The panel is provided with a plurality of elongated slots 48 and 49 (Figs. 2 and 3), usually two but not limited thereto, which serve as windows through which designated portions of the dial 42 may be seen. Suitable indexing lines 50 and 51 (Fig. 2) are disposed within the windows 48 and 49 respectively. A legend 52 (Fig. 3) may be provided on the panel 46 adjacent the window 48 and has numbers or similar indicia inscribed thereon in approximate alignment with a plurality of mathematical scales 54 inscribed on one side of the dial 42. Any suitable stop 56 (Fig. 4) may be provided on the under side of the dial 42 to limit the rotation thereof to one complete revolution of three hundred sixty degrees.

Referring to Fig. 3, the mathematical scales 54 on the dial 42 comprises a plurality of concentric non-linear conversion scales calibrated upon linear film measurement between known intervals of a surveying target, lens focal length of a camera, calibration constant and target image interval size, where $F=R/i$ and $D=f.k.R/i$ when:

$R=$ fixed target interval
$f=$ lens focal length in millimeters
$i=$ image target interval size in divisions ($k$ times millimeters)
$k=$ calibration constant of 2

The outermost scale 57 as viewed through the window 49 is graduated into two hundred linear parts, thus permitting a measurement on the scale of one part in two hundred or .005 millimeter.

The lines 24 (Fig. 7) on the screen 18 are equally spaced so that one revolution of the dial 42 will move the screen vertically exactly the space distance between any two adjacent lines 24. Index numbers 52ª corresponding to the legend indicia 52 on panel 46 are inscribed on the screen 18 adjacent to and in alignment with the lines 24 as clearly shown in Fig. 7. The horizontal lines 25 are disposed on the screen below the aforementioned lines 24. The uppermost line 25 is spaced below the lowermost line 24 the same distance as between the lines 24 for a purpose as will hereinafter be set forth. The remaining lines 25 are vertically spaced from each other in accordance with the calculations hereinbefore set forth relative to the calibration of the dial scales 54 in order to permit direct interpolations to be taken from the screen as will hereinafter be set forth.

The mirrors 14 and 16 are adapted to function for reflecting a projected film image to the screen 18. A rack and pinion unit 58 (Figs. 1 and 6) is proved to permit a horizontal adjustment of the mirrors 14 and 16 to depict the desired dimensions of film image on the screen 18. A plurality of elongated slots 59 cooperate with thumb screws 60 to securely hold the reflectors 14 and 16 in the proper horizontal position.

*Operation*

To determine unknown elevations and bearings of a given terrestrial position, a film image is made by a camera, such as is disclosed in the aforementioned Bazhaw Patent No. 2,616,177. As disclosed therein in order to obtain the desired bearings and elevations from the filmed data, a computer is required to interpolate readings from the developed film by a complicated and tedious process of millimeter measurements, and additional mathematical calculations to obtain distance factors and elevational factors utilized in the bearing and elevation formulae. The present invention substantially reduces the processes required in obtaining these data by projecting the film image onto the screen 18 for coordination with the data inscribed thereon to enable a computer to read factor and distance directly from the screen and the dial 42 cooperating therewith, thus eliminating the complex mathematical calculation previously required.

The projector 12 is normally disposed in the housing 20, but may be easily pivoted outwardly in a horizontal plane through an opening (not shown) provided in one wall of the housing 20 to facilitate the receiving of photographic film 62 (Fig. 1) upon which certain elevational and bearing data (not shown) has been recorded. The projector is then positioned within the housing between the reflectors 14 and 16 as hereinbefore described. The film image is projected onto the mirror 14, and reflected to the mirror 16 for transfer to the screen 18 as clearly shown by the dotted lines 63 in Fig. 1. The screen may be easily viewed from the front of the instrument 10 as clearly indicated by Fig. 2. The reflectors 14 and 16 may be simultaneously horizontally adjusted as hereinbefore described so that the distance between the dotted horizontal lines 65, representing data from the film image as projected upon the screen 18, is equal to the distance between the lines 24 on the screen 18. The knob 44 is then rotated counter-clockwise to the stop position. In this position, the hairline 51 of the window 49 (Fig. 3) is in alignment with the zero position (not shown) of the scale 57 viewed through the window 49. The film may be manually positioned within the projector so that the top target designation as represented by 67 on the film is positioned in approximate alignment with the uppermost line 24 indicated by the zero indicia of scale 52ª. However, manual adjustment usually is not of sufficient accuracy and proper positioning may now be obtained between the lines 24 and 65 to maintain subsequent coordination therebetween. This is accomplished by the screen 18 being raised or lowered by means of lever 28 so that line 24 disposed adjacent the zero indicia (Fig. 7) on the screen is centered on the top target 67 of the film image. From this position a clockwise rotation of the knob 44 will vertically adjust the screen 18 until the aforementioned line 24 adjacent the zero indicia coincides with the film image mil line 65 (Fig. 2) that is immediately below the top target 67. In this position of adjustment the scale 57 is read. As hereinbefore stated, the scale 57 is divided into two hundred parts, therefore this reading is the measurement of that portion of the two hundred parts in excess of the value of the mil line directly below the top target 67. The summation of this measurement and the mil line value to be hereinafter designated minus fifty will hereinafter be referred to as an H reading. The film image mil scale lines 65 are assigned progressive values which increase upwardly by twos from sixteen through eighty-four with value sixteen designating the lowermost mil line 65 on the film. The centrally disposed mil line 65 will thus be numbered fifty, and corresponds to the zero instrument level line on the film image. This line designated fifty is referred to as the level line. The values have been arbitrarily assigned to the mil scale lines 65 in order that all measurements may be made in the same direction without regard to the vertical angle at which the film was made in recording or photographing the film data. It will be apparent that other convenient numbers may be arbitrarily assigned to the mil lines if desired so that the level line will be designated one hundred or the like for a similar purpose.

The knob may be further rotated in a clockwise direction until a numbered line 24 is centered with the bottom film image target 69. The number on scale 52ª adjacent the line 24 that is centered on the target designated 69 indicates the particular dial scale 54 from which to read the factor and distance. For example, if the film target is centered by the screen line 24 which is adjacent the number three on scale 52ª, then the dial scale to be read is the scale adjacent the number three of the legend 52 in window 48. The value on the dial scale is determined by the hairline 50 of the window 48, and the distance may be read directly from the underside of the selected dial scale. A factor, also read directly from the upper side of the scale, which when multiplied by an H reading or computation, previously obtained, results in the elevation difference between the top target 67 and the level sight of the photographic instrument (not shown) with which the film was made. The elevation of the level sight of the camera is known. It will thus be apparent that a simple process of addition or subtraction will determine the elevation of the top target.

In the event that the film image target interval exceeds the distance from the screen scale line 24 adjacent the zero indicia of scale 52ª to the first or uppermost line 25, the common factor and distance readings from a selected scale 54 may be directly interpolated from the bottom target position with respect to the lines 25 without reference to the dial scales 54. In every instance, however, H must be obtained by use of the dial scale 57 as hereinbefore set forth. Thus, it will be seen that the screen scale lines 25 may be referred to as the common factor-distance screen scale lines.

The screen 18 also affords a view of other useful information, such as the azimuth circle 70, which may be recorded on the film, as is clearly shown in Fig. 2.

From the foregoing, it will be apparent that the present invention provides a projecting apparatus which greatly simplifies the calculation of elevational and bearing data obtained on film. Many readings may be taken directly from the dial scales, and only very simple mathematical computations are necessary to convert the factors read from the dial scales to the desired information. The present apparatus is simple and quick to operate and thereby eliminates the need for many trained workers. Thus, the machine substantially reduces operating costs and time consuming delays often necessary in conjunction with the use of a camera for determining terrestrial elevations and the like.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a projecting apparatus for correlating terrestrial elevational and bearing data comprising a housing, a projector within the housing, reflecting means cooperating therewith, means integral with the housing for horizontal adjustment of the reflectors, a screen having calibrated data inscribed thereon and positioned to receive a projected image from a film having unknown elevation and bearing data recorded thereon, adjusting means for raising and lowering the screen to provide synergetic relationship between the film data and calibrated screen data, a calibrated dial cooperating with the screen adjusting means and the calibrated data on the screen to provide visual known measurements for calculation of the recorded film data, said dial provided with concentric scales of non-linear calibrations calculated according to the following equations:

$$\text{Factor equals } R/i$$
$$\text{Distance equals } f.k.R/i$$

wherein:

R—fixed target interval
f—lens focal length of the camera in millimeters
i—image target interval size in divisions (k times millimeters)
k—calibration constant of 2 said calibrations permitting direct reading of distance and mathematical factors for simplifying the mathematical calculation of the film data.

2. In a projecting apparatus for correlating terrestrial elevation and bearing data comprising a housing, a projector within the housing, reflecting means secured within the housing, horizontal adjusting means integral with the housing for positioning the reflecting means with respect to the projector, a projection screen having calibrated data inscribed thereon adapted to receive a projected image having undetermined elevation and bearing data recorded thereon, means for vertical adjustment of the screen to provide synergetic relationship between the projected image and the calibrated screen data, a calibrated dial adapted for rotation by the screen adjusting means, said dial provided with concentric scales of non-linear calibrations determined in accordance with the following equations:

$$\text{Factor equals } R/i$$
$$\text{Distance equals } f.k.R/i$$

wherein:

R—fixed target interval
f—lens focal length of the camera in millimeters
i—image target interval size in divisions (k times millimeters)
k—calibration constant of 2 said calibrated scales permitting direct interpolations and measurements therefrom to correlate the undetermined film data with the calibrated screen data thereby facilitating the calculations of the recorded film data.

3. In a projecting apparatus for correlating terrestrial elevation and bearing data comprising a housing, a projector within the housing, a reflecting means secured within the housing and adapted to cooperate with the projector to transfer a film image having unknown elevation and bearing data recorded thereon to a projection screen, said screen provided with calibrated data to complement a calibrated dial, said dial provided with a plurality of concentric scales of non-linear calibrations determined in accordance with the following equations:

$$\text{Factor equals } R/i$$
$$\text{Distance equals } f.k.R/i$$

wherein:

R—fixed target interval
f—lens focal lenth of the camera in millimeters
i—image target interval size in divisions (k times millimeters)
k—calibration constant of 2 adjustment means to simultaneously rotate the dial and vertically position the screen to a position of synergetic relation with the film image data to permit direct measurements and interpolations from the dial thereby facilitating the calculation of the recorded film data to obtain elevational and bearing data therefrom.

4. In a projecting apparatus for correlating terrestrial elevation and bearing data comprising a housing, a projector within the housing, a projection screen adapted to be viewed from the front of the apparatus, reflecting means secured within the housing to cooperate with the projector for transferring a film image having unknown elevation and bearing data recorded thereon to the screen, calibrated data inscribed on the screen to complement the film image data, a calibrated dial cooperating therewith, said dial provided with a plurality of concentric scales of non-linear calibrations in accordance with the following equations:

$$\text{Factor equals } R/i$$
$$\text{Distance equals } f.k.R/i$$

wherein:

R—fixed target interval
f—lens focal length of the camera in millimeters
i—image target interval size in divisions (k times millimeters)
k—calibration constant 2 for facilitating the mathematical calculation of the film image data, adjusting means to simultaneously rotate the dial and vertically position the screen with respect to the film image in order to synchronize the data therebetween and provide direct readings from the dial to determine terrestrial elevations and bearings.

5. In a projecting apparatus for correlating terrestrial elevation and bearing data comprising a housing, a projector within the housing, a projection screen adapted to be viewed from the front of the apparatus, reflecting means secured within the housing to cooperate with the projector for transferring a photographic film image having unknown elevation and bearing data recorded thereon to the screen, said film data including the visual intercept distance of spaced targets on a surveying rod, calibrated data inscribed on the screen to complement the film image data, adjusting means to vertically position the screen with respect to the film data to obtain a synergetic relationship therebetween permitting direct interpolations and measurements from the screen data to facilitate calculations of the recorded film data, a calibrated dial adapted for rotation by the adjusting means to cooperate with the screen data, said dial provided with concentric scales of non-linear calibrations determined in accordance with the following equations:

$$\text{Factor equals } R/i$$
$$\text{Distance equals } f.k.R/i$$

wherein:

$R$—fixed target interval
$f$—lens focal length of the camera in millimeters
$i$—image target interval size in divisions (k times millimeters)
$k$—calibration constant of 2

References Cited in the file of this patent

UNITED STATES PATENTS

| | | |
|---|---|---|
| 1,550,174 | Prieur | Aug. 18, 1925 |
| 2,422,611 | Becker | June 17, 1947 |
| 2,504,503 | De Boer | Apr. 18, 1950 |
| 2,521,820 | Beardsley | Sept. 12, 1950 |